United States Patent [19]

Namba et al.

[11] 4,131,506

[45] Dec. 26, 1978

[54] METHOD OF PRODUCING ECHELETTE GRATINGS

[75] Inventors: Susumu Namba, Tokyo; Yoshinobu Aoyagi, Kamifukuoka, both of Japan

[73] Assignee: Rikagaku Kenkyusho, Wako, Japan

[21] Appl. No.: 750,914

[22] Filed: Dec. 15, 1976

[30] Foreign Application Priority Data

Dec. 19, 1975 [JP] Japan ............................. 50-151283

[51] Int. Cl.$^2$ ..................... H01L 21/306; B44C 1/22; C03C 15/100; C03C 25/06
[52] U.S. Cl. ................................. 156/643; 156/659; 156/662; 156/668; 204/192 E
[58] Field of Search .................. 219/121 EB, 121 EM; 204/192 E, 192 EM; 350/3.5, 162 R, 162 SF, 162 ZP; 96/36, 38.3; 250/531; 156/643, 654, 659, 662, 668

[56] References Cited

U.S. PATENT DOCUMENTS

| 3,733,258 | 5/1973 | Hanak et al. ...................... 204/192 |
| 3,860,783 | 1/1975 | Schmidt et al. .............. 219/121 EM |
| 4,016,062 | 4/1977 | Mehta et al. .................. 219/121 EM |
| 4,056,395 | 11/1977 | Sato et al. ......................... 156/654 X |

Primary Examiner—William A. Powell
Attorney, Agent, or Firm—Fleit & Jacobson

[57] ABSTRACT

Disclosed is a method of producing echelette gratings using a beam of electrically charged particles to bomber a masked substrate. The shape and blazed angle "δ" of the echelette grating is controlled by putting the substrate at a selected slant angle "θ" with regard to the beam of electrically charged particles.

7 Claims, 11 Drawing Figures

METHOD OF PRODUCING ECHELETTE GRATINGS

This invention relates to a method of producing echelette gratings. As is well known, an echelette grating is one type of diffraction grating having saw-tooth parallel grooves made on the surface of the plane substrate.

Recently the study of photointegrated circuits to be used in the field of photo-communication has been progressed. The demand for high precision echelette gratings has been accordingly increasing. The holography has been advantageously used in producing echelette gratings. Compared with the saw-tooth grates of a substrate with a blade, the holography is advantageous to form an increased number of saw-tooth grates on the surface of a substrate at a high precision, and the so-produced holographic grating is less expensive. Such echelette gratings are referred to as "Blazed Holographic Gratings" in the papers by (1) N. K. Sheriden borne in the magazine, "Applied Physics, Letters" Vol. 12 (1968) page 316, and (2) H. Nagata and M. Kishi borne in the magazine, "Japanese Journal, Applied Physics, Supplement No. 14" (1975), page 181.

BRIEF DESCRIPTION OF THE DRAWINGS

In the detailed description of the preferred embodiments of the invention presented below, reference is made to the accompanying drawings, in which:

FIG. 3b is an enlarged sectional view schematically illustrating ion beam bombardment of the substrate of FIG. 3a;

As shown in FIG. 1, in the forming an echelette grating on a plane substrate according to the holography, a beam of coherent light from a laser source 1 after passing lenses 2 and 3 and after reflecting from a mirror 4, is projected onto the opposite surfaces of a transparent substrate 5 at an inclined angle. One of these opposite surfaces is coated with a photosensitive material. As a result of the interference between the different beams of coherent light projected onto the opposite surfaces of the substrate, an interference fringe appears on the photosensitive coated substrate. Then, the so-exposed substrate is subjected to development, so that the grating in the form of interference fringe results on the substrate. FIG. 2 shows an enlarged sectional view of the echelette grating, which is made according to the method as shown and described with reference to FIG. 1. As shown in FIG. 2, in the thickness of photo-sensitive coating 7 a saw-tooth grating is formed with each tooth lying in each nodal plane "A" of the interference fringe. Exposing, developing and other photographic treatments according to the holography, however, exert adverse influence in forming the saw-tooth shape of the grating. Therefore, it is difficult to form echelette gratings having as much exact blazed angle "δ" as required. This has hitherto prevented echelette gratings from serving as a diffraction grating in the industrial field.

The object of this invention is to provide a method of producing echelette gratings having a well defined saw-tooth shape with a well controlled blazed angle.

To attain this object a method of producing echelette gratings according to this invention uses a diffraction (or precision) grating formed on one surface of a substrate as a mask, and the substrate is selectively removed by bomberding the so-masked surface with ions or electrons. It should be noted that a beam of ions or electrons be projected slant with regard to the masked surface of the substrate, provided that the component of the beam to be projected on the masked surface of the substrate does not lie in parallel with the strips of the masking grating. This invention will be better understood from the actual examples, which will be described with reference to FIGS. 3 to 9 of the accompanying drawings.

EXAMPLE 1

First, a masking grating was formed according to the conventional holography. A substrate was essentially made of GaAs single crystal or polymethylmethacrylate, and was coated one $\mu$m thick with a photosensitive resin (AZ-1350). An argon ion laser (4579A) was used in projecting two different beams of coherent light onto the substrate. The coating surface of the substrate was exposed to the coherent light in the form of interference fringe. Then, the so-exposed substrate was subjected to development, using a developing agent commercially available as AZ-303. The coating of the substrate was selectively removed so that a masking grating appeared on the substrate, as diagrammatically shown in FIG. 3a. The masking grating thus formed had about one thousand photosensitive resin stripes 9 per one milimeter on the substrate.

Figure 1:
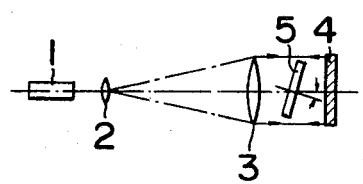
FIG. 1 is a schematic illustration of an apparatus using holography to form an echelette grating on a plane substrate.
Figure 2:
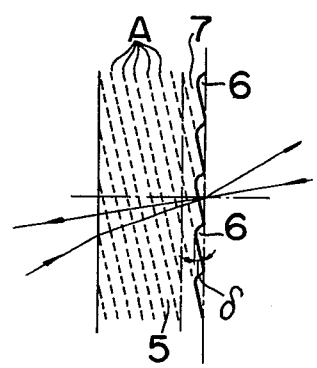
FIG. 2 is an enlarged sectional view of an echelette grating produced by the apparatus of FIG. 1.
Figure 3A:
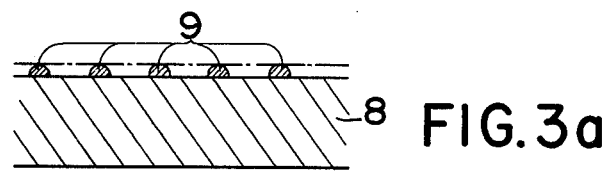
FIG. 3a is an enlarged sectional view of a masking grating formed on a substrate by selectively exposing, developing and removing a coating of the substrate.
Figure 3B:
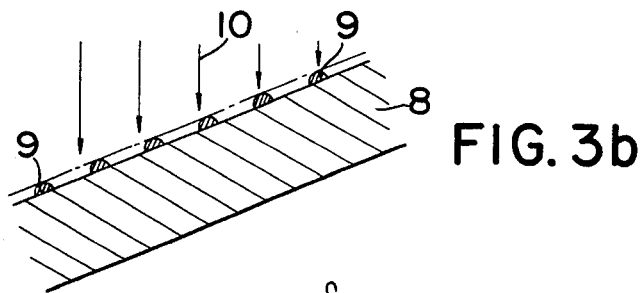
Figure 3C:
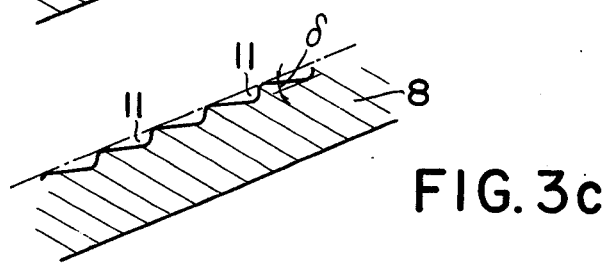
FIG. 3c is an enlarged sectional view of the substrate of FIG. 3a after ion bombardment.

The so-masked substrate was exposed to a beam of ions 10. As shown in FIG. 3b, the ion beam was projected onto the substrate at a slant angle with regard to the surface of the substrate, thus selectively removing the material from the substrate. As a result a diffrection grating having saw-toothed grooves 11 was provided, as shown in FIG. 3c.

Figure 4:
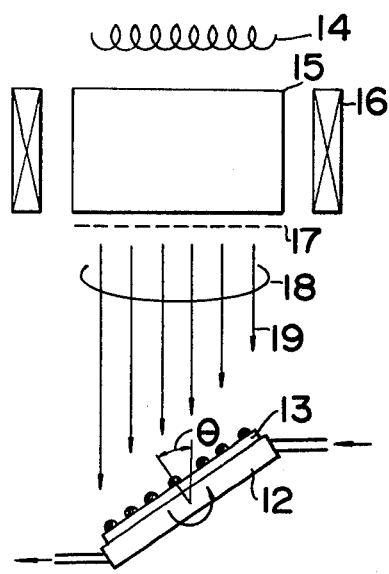
FIG. 4 is a schematic illustration of an apparatus of the type used to ion bombard the substrate of FIG. 3b.

FIG. 4 shows an argon ion etching apparatus which was used in producing the echelette grating. The substrate 13 on the stage 12 of the apparatus was water-cooled to avoid the adverse thermal effect. The stage 13 was rotatably mounted as indicated by arrow. 14 is a thermal cathode, 15 an anode, 16 a magnet, 17 a cold cathode, 18 a neutralizer, and 19 a beam of argon ions. An accelerating voltage was 750 volts, and an ion current was about 1 miliampere. Different echelette gratings were produced by projecting a beam of ions at different beam angles "θ". Etching time was about twenty minutes long for each sample.

Figure 5:
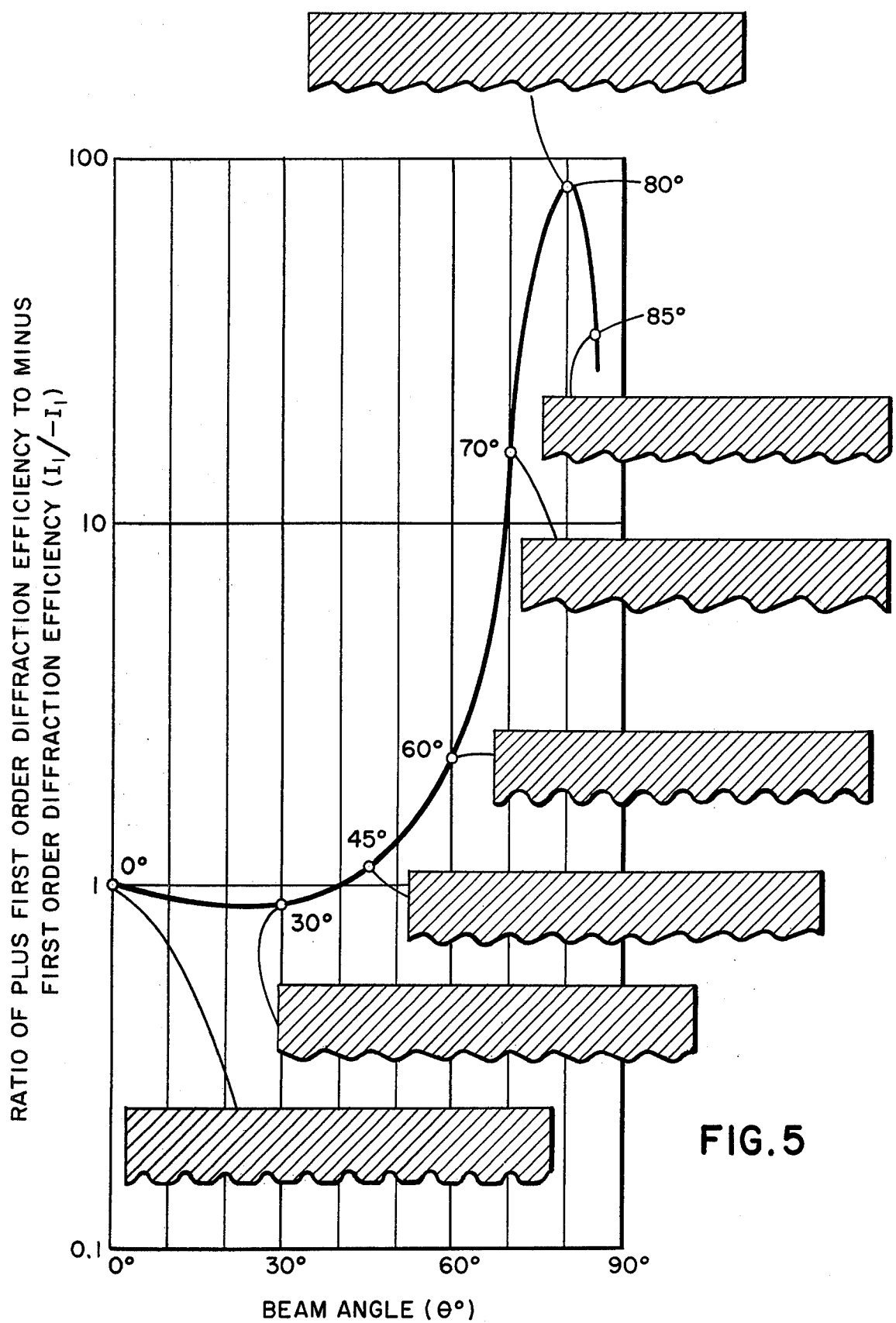
FIG. 5 illustrates various profiles of the substrate of FIG. 3c.

FIG. 5 shows the profiles of the echelette gratings, which were determined by using a scanning type electron microscope. Also, it shows how the ratio of plus first order diffraction efficiency to minus first order diffraction efficiency ($I_1/I_{-1}$) varies with the beam angle "θ". The wave length of the incidence light was 3250 A. As seen from FIG. 5, each groove of the grating is in the form of a trapezoid for zero degrees of beam angle "θ". The shape of groove is a saw-tooth in the range of beam angle from 60 to 80 degrees. FIG. 5 shows that the ratio of plus to minus first order diffraction efficiency increases to the maximum at eighty degrees of beam angle. This is because the wavelength of the incidence light was nearly equal to the blazing wavelength of the grating (3400 A) so that the diffraction light was mainly concentrated at the plus first order diffraction.

Figure 6:
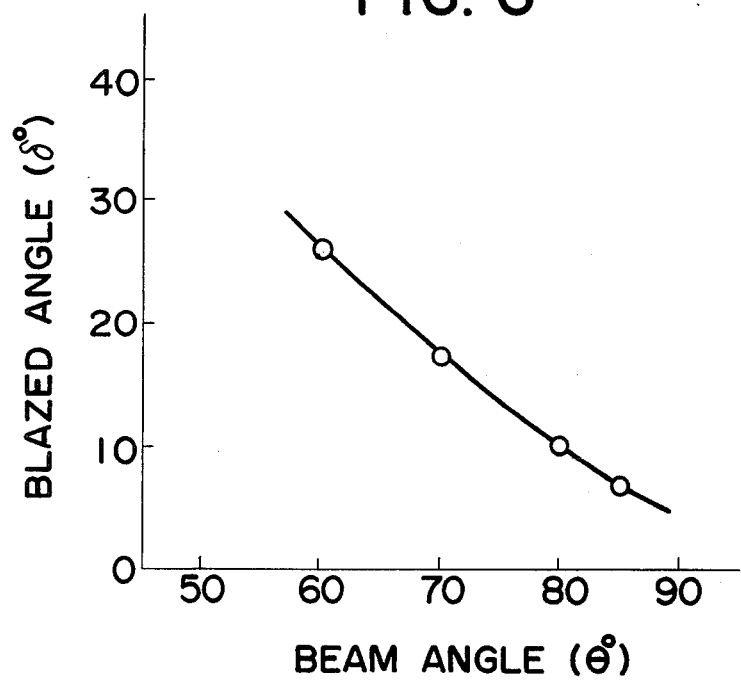
FIG. 6 is a graph illustrating the relationship between two parameters of the apparatus of FIG. 4.

FIG. 6 shows the connection between blazed angle "δ" and beam angle "θ". As seen from the graph, the blazed angle "δ" varies with the beam angle "θ" in the range from 7 to 26 degrees. This range of blazed angle corresponds to the blazed wavelength ranging from 2400 A to 7900 A. In other words the graph shows the board range within which a blazed angle of the echelette grating may be controlled according to this invention.

Figure 7:
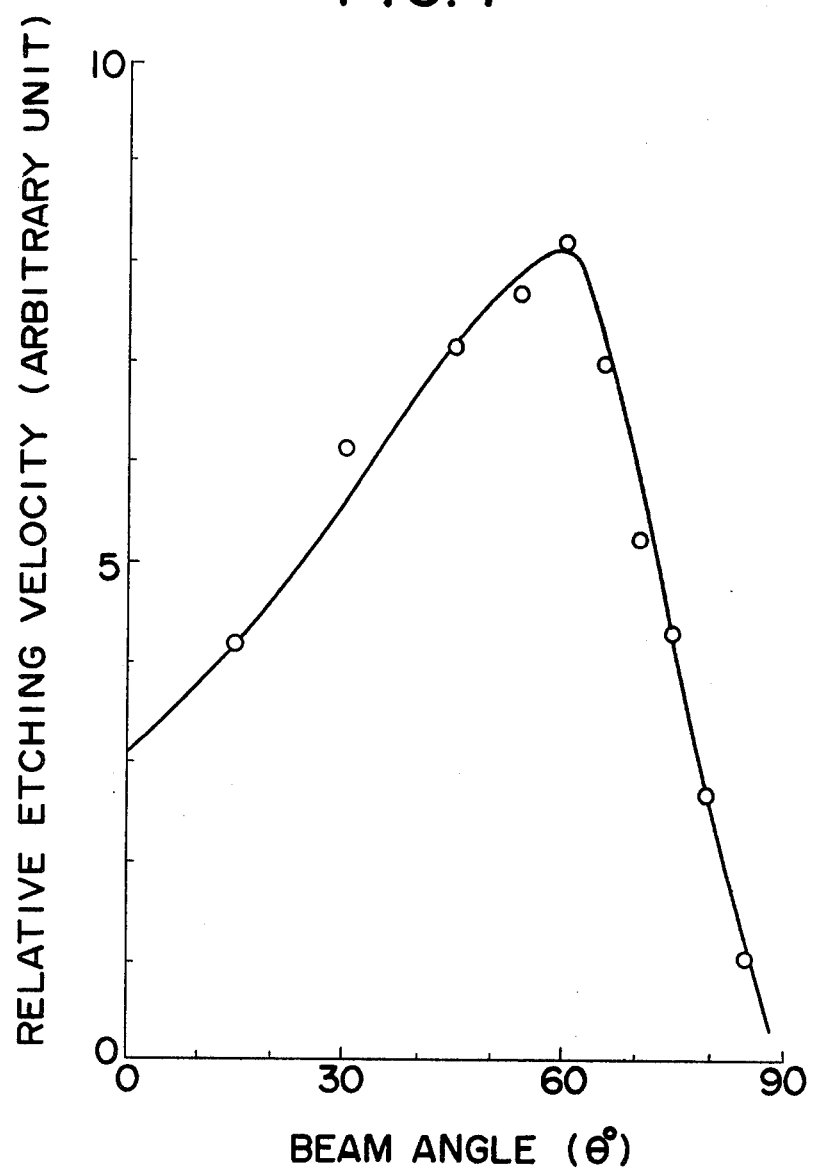
FIG. 7 is a graph illustrating the variation of ion etching velocity with beam velocity.

FIG. 7 shows how the ion etching velocity varies with the beam angle. As seen from the graph, the relative ion etching velocity against zero and ninty degrees is relatively low. This shows that in the course of etching the part of the substrate which lies perpendicular or parallel to the incidence of ion beam is less etched than the other part of the substrate, thus causing the saw-tooth grating to be formed on the substrate.

Figure 8:
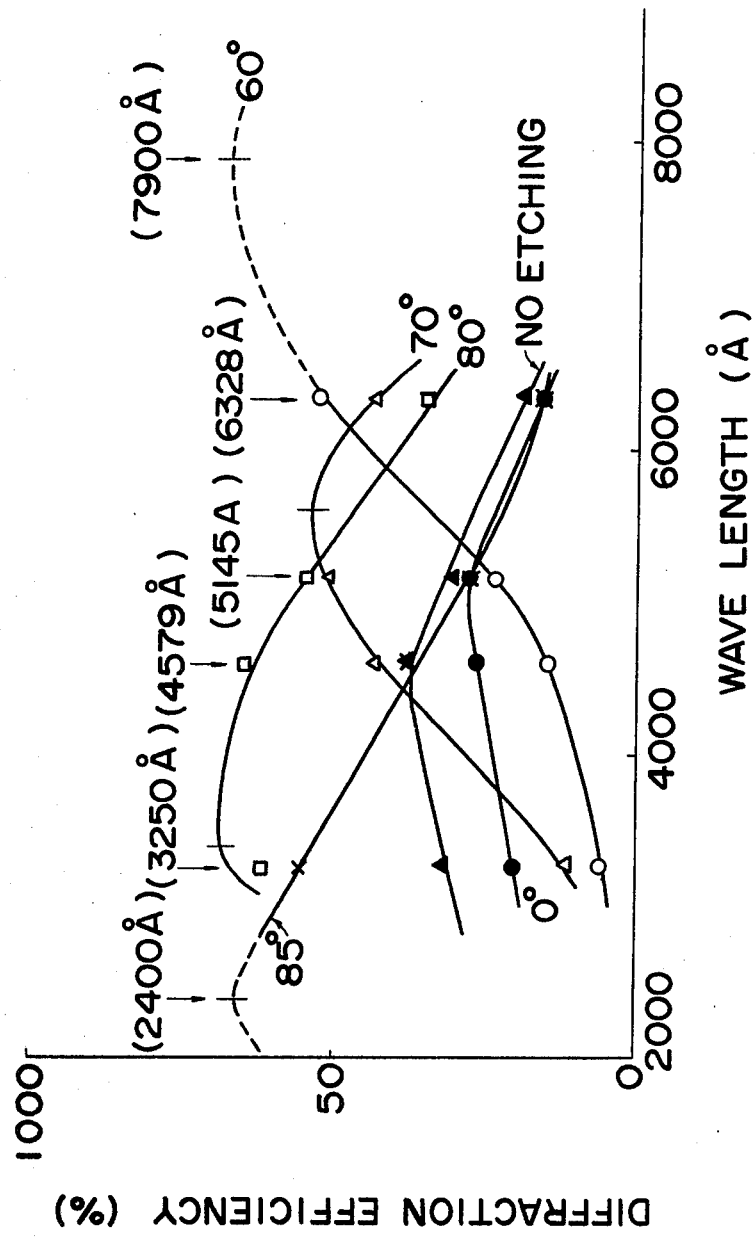
FIG. 8 is a graph illustrating the variation of diffraction efficiency with wavelength for different beam angles.

FIG. 8 shows how the diffraction efficiency varies with the wavelength for different beam angles. The maximum ratio is as large as 64 percents for 85, 80 or 60 degrees, and the maximum ratio is as large as 50 percents for 70 degrees. These figures are much larger than that (41%) of the diffraction grating which was produced according to the conventional holographic blazing method. Also, FIG. 8 shows that as the beam angle "θ" decreases, the peaks of the curves shift to increasing wavelength on the axis of abscissa. The curve "no etching" is for a substrate having a masking grating before subjected to etching.

As is apparent from the above, according to the etching method of this invention an echelette grating having a well-controlled blazed angle can be produced, and the so-produced echelette grating has an increased rate of diffraction efficiency, compared with that of the diffraction grating which was produced according to the conventional holographic blazing method.

EXAMPLE 2

CdS, quartz or glass substrates were used, and echelette gratings were formed on these substrates for the same manufacturing factors as in Example 1. In case were CdS substrates were used, echelette gratings similar to that in Example 1 resulted. But, in case where quartz or glass substrates were used, the resulting echelette gratings were of a less quality, compared with those of CdS substrate.

Figure 9:
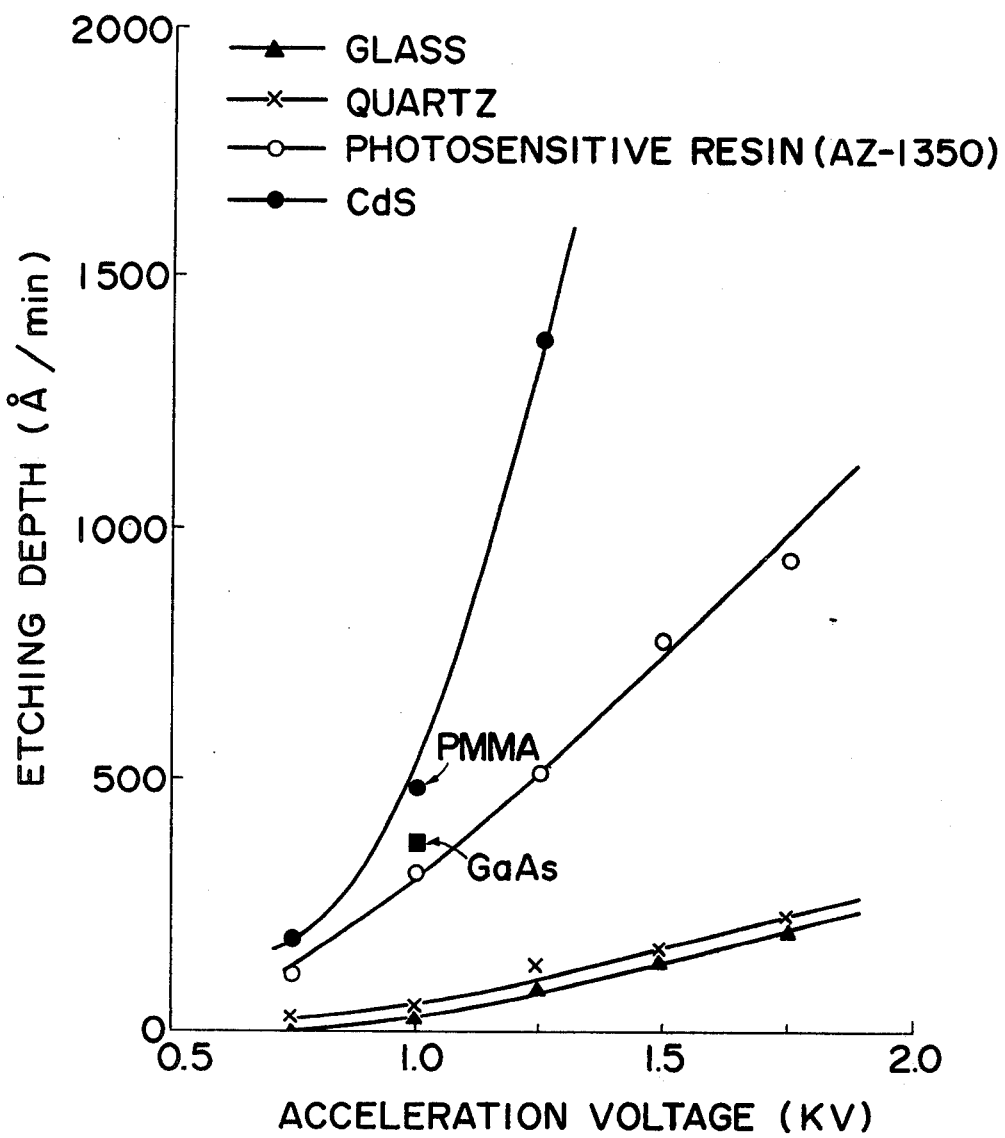
FIG. 9 is a graph illustrating the relationship between etching depth and acceleration voltage with regard to different substrate materials.

FIG. 9 shows the connection between etching depth and acceleration voltage with regard to different substrate materials and a photosensitive coating material (AZ-1350). As seen from these curves, the sputtering ratio of GaAs, PMMA or CdS is of a large value, compared with the sputtering ratio of the coating material, whereas the sputtering ratio of quartz or glass is of a small value. Therefore, if quartz or glass substrates are used, these substrates will be etched at a slow ratio, compared with the masking material, and as a natural consequence the masking grating will be deformed before blazing the substrate at a definite blazed angle as desired, and the resulting echelette grating will be of a less quality. As is apparent from this, preferably used is a substrate material whose sputtering ratio is of a value larger than the sputtering ratio of the coating material.

The above examples were described as using a beam of ions, but it should be understood that a beam of electrons is equally used fo the same purpose.

What is claimed is:

1. A method of producing echelette gratings comprising the steps of:
    using holographic masking techniques to produce a mask grating on a substrate;
    rotating the masked substrate with respect to a source of a beam of charged particles to form a desired oblique angle between the beam and surface of the masked substrate;
    projecting a beam of charged particles onto the masked substrate at the desired oblique angle to the surface of the substrate for eroding the substrate thereby leaving sawtooth parallel grooves in the substrate; and
    water cooling the masked substrate while it is being eroded by the beam of charged particles.

2. A method of producing echelette gratings according to claim 1 wherein said beam of charged particles is an electron beam.

3. A method of producing echelette gratings according to claim 1 wherein said substrate is comprised of GaAs.

4. A method of producing echelette gratings according to claim 5, wherein the amount of material removed from the substrate is greater than the amount removed from the mask grating during a given time interval.

5. A method of producing echelette gratings according to claim 1 wherein said beam of charged particles is an ion beam.

6. A method of producing echelette gratings according to claim 1 wherein said substrate is comprised of polymethylmethacrylate. pg,12

7. A method of producing echelette gratings according to claim 1 wherein said substrate is comprised of CdS.

* * * * *